(12) United States Patent
Osborne et al.

(10) Patent No.: US 6,842,813 B1
(45) Date of Patent: Jan. 11, 2005

(54) METHOD AND APPARATUS FOR SINGLE WIRE SIGNALING OF REQUEST TYPES IN A COMPUTER SYSTEM HAVING A POINT TO POINT HALF DUPLEX INTERCONNECT

(75) Inventors: Randy B. Osborne, Beaverton, OR (US); David J. Harriman, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 09/591,928

(22) Filed: Jun. 12, 2000

(51) Int. Cl.[7] .............................................. G06F 13/00
(52) U.S. Cl. ...................................................... 710/305
(58) Field of Search ................................ 710/305–306, 710/240, 242–243, 107–124, 309, 121

(56) References Cited

U.S. PATENT DOCUMENTS

| | | |
|---|---|---|
| 4,574,350 A | 3/1986 | Starr |
| 5,129,090 A | 7/1992 | Bland |
| 5,392,404 A | 2/1995 | Thompson |
| 5,448,701 A | 9/1995 | Metz et al. |
| 5,682,508 A | 10/1997 | Hocker et al. |
| 5,771,356 A | 6/1998 | Leger et al. |
| 5,787,264 A * | 7/1998 | Christiansen et al. ....... 710/113 |
| 5,859,990 A | 1/1999 | Yarch |
| 5,872,936 A * | 2/1999 | Eckstein .................... 710/107 |
| 5,915,101 A | 6/1999 | Kleineberg et al. |
| 6,016,528 A * | 1/2000 | Jaramillo et al. ........... 710/243 |
| 6,105,094 A * | 8/2000 | Lindeman ................... 710/107 |
| 6,145,039 A * | 11/2000 | Ajanovic et al. ........... 710/105 |
| 6,151,651 A * | 11/2000 | Hewitt et al. ............... 710/315 |
| 6,175,884 B1 * | 1/2001 | Harriman et al. ............. 710/30 |
| 6,223,238 B1 * | 4/2001 | Meyer et al. ............... 710/312 |
| 6,256,697 B1 | 7/2001 | Ajanovic et al. |
| 6,272,563 B1 * | 8/2001 | Ajanovic et al. ............. 710/29 |
| 6,393,505 B1 * | 5/2002 | Scalise et al. .............. 710/107 |
| 6,418,538 B1 | 7/2002 | Garney et al. |
| 6,473,780 B1 | 10/2002 | Barcelo |
| 6,618,782 B1 * | 9/2003 | Gulick et al. ............... 710/305 |

FOREIGN PATENT DOCUMENTS

| | | |
|---|---|---|
| DE | 4426123 A1 | 2/1996 |
| EP | 0552507 A1 | 7/1993 |

OTHER PUBLICATIONS

PCT Search Report, PCT/US00/26875, Mar. 15, 2001.

* cited by examiner

*Primary Examiner*—Glenn A. Auve
*Assistant Examiner*—Nimesh G Patel
(74) *Attorney, Agent, or Firm*—Blakely, Sokoloff, Taylor & Zafman LLP (57) ABSTRACT

According to one embodiment, a computer system is disclosed. The computer system includes a first agent, a point to point half duplex interface coupled to the first agent and a second agent coupled to the first point to point half duplex interface. The first agent is adaptable to transmit a signal to the second agent via a first component of the interface indicating the type of data traffic to be transmitted to the second agent.

23 Claims, 8 Drawing Sheets

METHOD AND APPARATUS FOR SINGLE WIRE SIGNALING OF REQUEST TYPES IN A COMPUTER SYSTEM HAVING A POINT TO POINT HALF DUPLEX INTERCONNECT

FIELD OF THE INVENTION

The present invention pertains to computer systems. More particularly, the invention pertains to distinguishing critical and best effort access requests via a single wire in a computer system having a point to point half duplex interconnect.

BACKGROUND OF THE INVENTION

Since the advent of computer systems, there has been a continuous push to reduce production costs in order to provide quality systems at reduced monetary costs. One major factor that increases production costs is the expense associated with interchip connections. The number of pins that are necessary to make chip connections increase production costs of a computer system. As a result, there is an ever-increasing demand to make inter-chip connections fast and narrow.

In typical chipsets, the two major classes of data traffic are best effort (or asynchronous (i.e., traffic must eventually be delivered)) and critical (or isochronous (i.e., data must be delivered within a specified time)). In computer systems where best effort and critical traffic classes compete for a shared resource, the quality of service received by critical traffic can generally be improved if arbitration for the resource is aware of the class of the pending requests. However, the arbiter for the shared resource typically cannot distinguish whether a pending request is best effort or critical. As a result, the arbiter must either assume all requests are best effort or assume all requests are critical.

Assuming all requests are best effort may result in poor latency if a pending request is actually critical since a plurality of requests from one device competing for the resource may be completed before granting access to another device. Assuming all requests are critical results in alternating between each competing device on a request by request basis. The alternating scheme results in tighter latency for critical performance. Nevertheless, there is degradation in performance for best effort requests because of the cost of turnarounds. Each turnaround consumes one or more clock cycles on the interface for electrical turnaround. Thus in the presence of back to back best effort requests there is a degradation of effective bandwidth due to the wasted clocks for interface turnaround. One method of distinguishing whether a pending request is best effort or critical is to add a pin for each type of request at each device competing for the shared resource. However, the addition results in an extra two pins at each device. The addition of such a high quantity of pins is undesirable since it results in an increase of cost. Therefore, a method and apparatus for signaling of critical and best effort requests is desired.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A method and mechanism for distinguishing request types across a point to point half duplex interconnect in a computer system is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Figure 1:
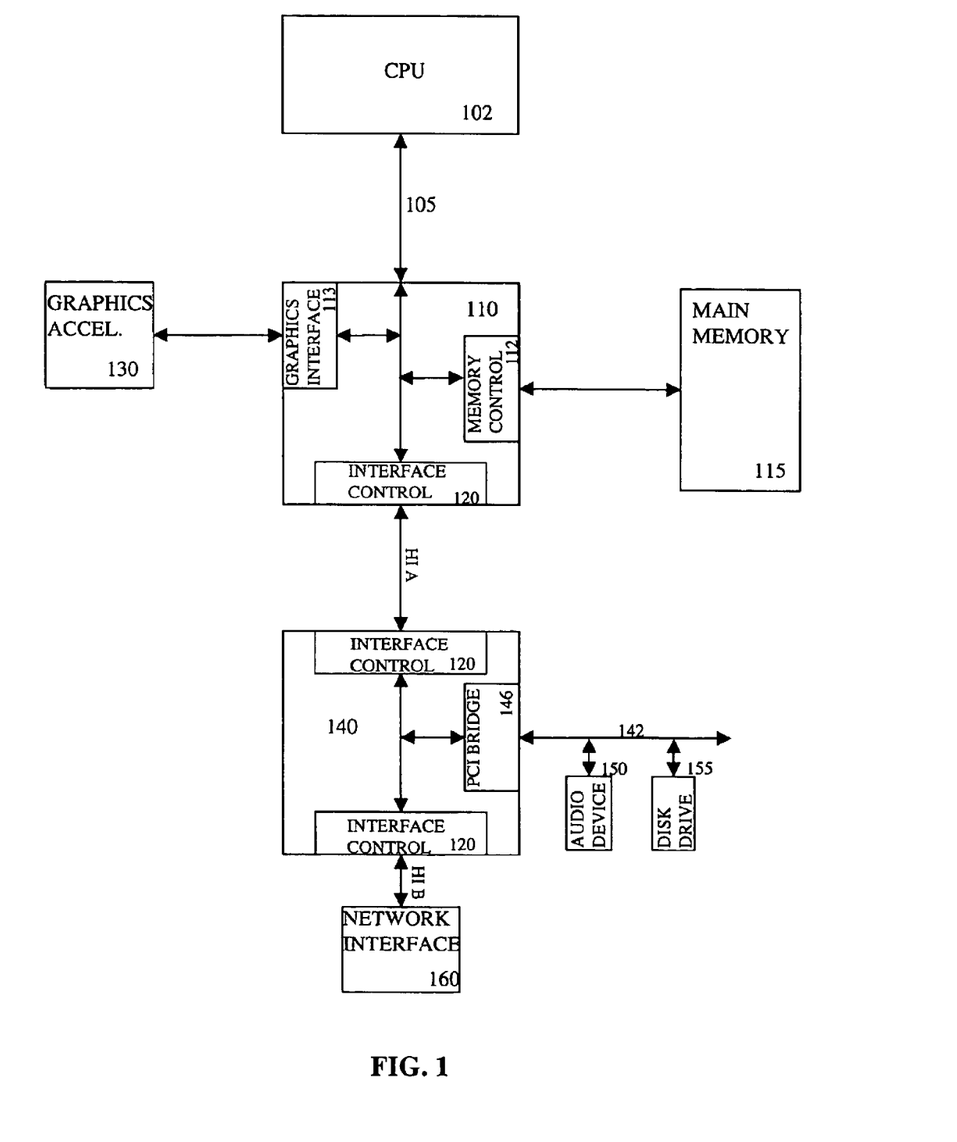
FIG. 1 is a block diagram of one embodiment of a computer system.

FIG. 1 is a block diagram of one embodiment of a computer system 100. By Computer system 100 includes a central processing unit (CPU) 102 coupled to bus 105. In one embodiment, CPU 102 is a processor in the Pentium® family of processors including the Pentium® II processor family and Pentium® III processors available from Intel Corporation of Santa Clara, Calif. Alternatively, other CPUs may be used.

A memory control hub (MCH) 110 is also coupled to bus 105. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM). However, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to a Specification Revision 2.0 interface developed by Intel Corporation of Santa Clara, Calif. In addition, MCH 110 includes a hub interface controller 120. Interface controller 120 is used to couple MCH 110 to an input/output control hub (ICH) 140 via a hub interface A. ICH 140 provides an interface to input/output (I/O) devices within computer system 100. ICH 140 also includes a hub interface controller 120 that is used for coupling to MCH 110.

ICH 140 may include other interface controllers 120. For example, a second interface controller 120 may be coupled to a network interface 160 via a hub interface B. Nevertheless, one of ordinary skill in the art will appreciate that other hub interface controllers 120 may be coupled to other devices.

Devices coupled together via a hub interface may be referred to as hub interface agents. A hub interface agent that is positioned closer to CPU 102 in computer system 100 in terms of travel distance may be referred to as an upstream agent, while an agent that is further away from CPU 102 is referred to as a downstream agent. For example, for the MCH 110/ICH 140 hub interface, MCH 110 is the upstream agent and ICH 140 is the downstream agent.

ICH 140 may also include a PCI bridge 146 that provides an interface to a PCI bus. PCI bridge 146 provides a data path between CPU 102 and peripheral devices. Devices that may be coupled to PCI bus 142 include an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

Figure 2:
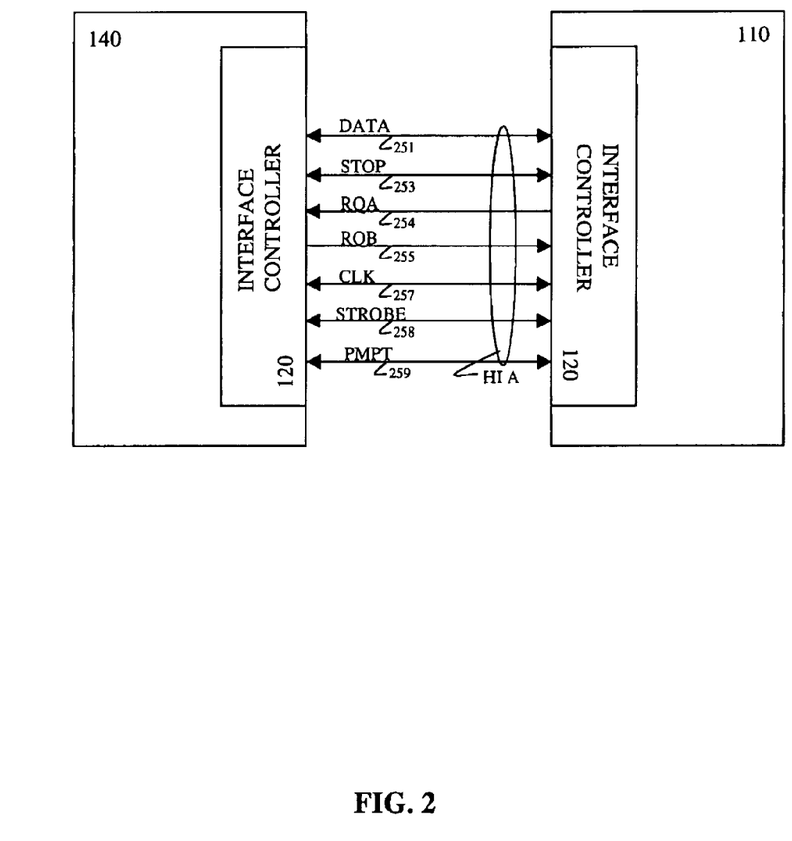
FIG. 2 is a block diagram of one embodiment of a memory control hub (MCH) and an input/output control hub (ICH) connected via a hub interface bus.

FIG. 2 is a block diagram of one embodiment of MCH 110 coupled to ICH 140 via hub interface A. A hub interface is a mechanism for connecting main building blocks of the core logic of a computer system, such as computer system 100, via a relatively narrow and relatively high bandwidth data path. Between individual components in computer system 100, such as between MCH 110 and ICH 140, the connection is implemented in a point-to-point fashion. According to one embodiment, transfer of information across the hub interface bus is accomplished using a packet-based split-transaction protocol. Hub interfaces will be discussed in more detail below.

The hub interface includes a bi-directional data path 251, a stop signal wire 253, a request A (RQA) signal wire 254, a request B (RQB) signal wire 255, a clock (CLK) signal wire 257 and data strobe (STROBE) signal wires 258. According to one embodiment, data path 251 is 8 binary bits wide. However, data path 251 may be any width (e.g., 16, 32, etc.) in other embodiments. Stop signal 253 is a bi-directional signal used for flow control. According to one embodiment, stop signal 253 is transmitted from a first agent to a second agent in order to indicate that the buffers of the first agent is full and that the first agent cannot continue to receive data from the second agent. Consequently, the second agent stops the transmission of data.

RQA signal 254 and RQB signal 255 are request signals that, during normal system operation, are asserted in order to request control of the hub interface. STROBE signals 258 are used to synchronize data into a hub agent while operating in a source synchronous mode. According to one embodiment, STROBE signals 258 may clock data at four times the frequency of the clock signal. Alternatively, STROBE signals 258 may operate at a multiple of the clock signal other than four. For example, STROBE signals 258 may run at a rate of eight times that of the clock signal 257. Further, hub interface A may include other signal paths, such as a reset signal for resetting system 100.

A preempt (PMPT) wire 259 is also included in the hub interface. PMPT wire 259 indicates a request by one agent to preempt the grant tenure of the interface by the other agent request (critical or best effort) received at one end (e.g., agent A (MCH 110)) of the hub interface relative to the grant, if any, in progress at the agent at the opposite end (e.g., agent B (ICH 140)). According to one embodiment, PMPT wire 259 is implemented using an alternating ownership wire. The alternating ownership wire may be clocked by the common clock signal 257. In one embodiment, PMPT wire 259 is asserted for the duration a request waits to be granted. In the following, PMPT wire 259 is asserted whenever the PMPT signal is driven to a logical 1 value and de-asserted whenever the PMPT signal is driven to a logical 0 value.

Figure 3:
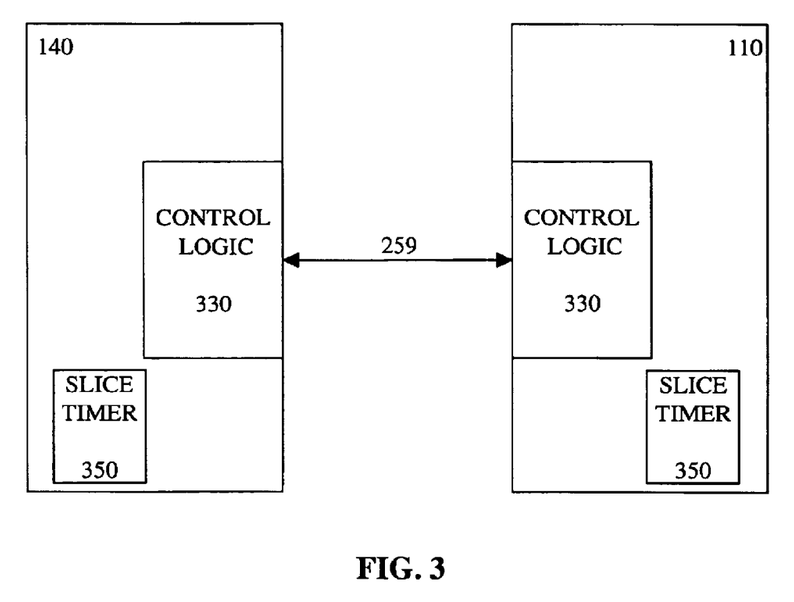
FIG. 3 is a block diagram of a preempt wire segment of a hub interface.

FIG. 3 is a block diagram of a PMPT wire 259 segment of a hub interface. According to one embodiment, MCH 110 and ICH 140 each include control logic 330 coupled via PMPT wire 259. Control logic 330 at each end of the hub interface detects when PMPT wire 259 is asserted at the opposite end of the interface, indicating a critical request. According to one embodiment, control logic 330 may assert the PMPT wire 259 on any clock edge during which the requesting agent owns access to the interface. According to one embodiment, ownership of PMPT wire 259 tracks the ownership of data path 251 by the opposite end with a one clock pipeline delay. An agent may assert PMPT wire 259 on any clock edge during which it owns PMPT wire 259 and has a critical request.

According to one embodiment, an agent may sample PMPT wire 259 only if the opposite end owned PMPT wire 259 at the previous clock edge. An agent is granted ownership of PMPT wire 259 one clock cycle after the agent at the other end of the interface begins to drive data on data path 251 until one clock after it stops driving the data path. In one embodiment, PMPT wire 259 is asserted for a critical request and is de-asserted for a best effort request. However one of ordinary skill in the art will appreciate that the signals may be reversed.

MCH 110 and ICH 140 also include slice timers 350. Slice timers 350 keep track of the amount of time a particular agent has maintained control of the hub of interface. According to one embodiment, an agent relinquishes control of the interface if a predetermined time interval counted by its slice timers 350 has elapsed and the agent at the opposite end of the interface is requesting access. One of ordinary skill in the art will appreciate that slice timers 350 may be external to MCH 110 and ICH 140.

If agent A samples PMPT wire 259 asserted, then agent A uses this signaling of a critical request from the opposite end to relinquish its use of the interface to the opposite end as soon as convenient. The exact point at which agent A relinquishes its ownership of the interface depends on the current request packet and perhaps agent A's next requests in the same timeslice. According to one embodiment, the simplest policy is to compare with the current request packet. Thus, if agent A samples PMPT wire 259 asserted and agent A's current request packet is a best effort request, agent A should relinquish the interface as soon as possible (e.g. at the end of the next cache line or end of the current packet, whichever is first). However, if agent A's current request packet is critical, then agent A's ownership of the interface continues until either the next request is a best effort request or the end of agent A's timeslice.

Figure 4:
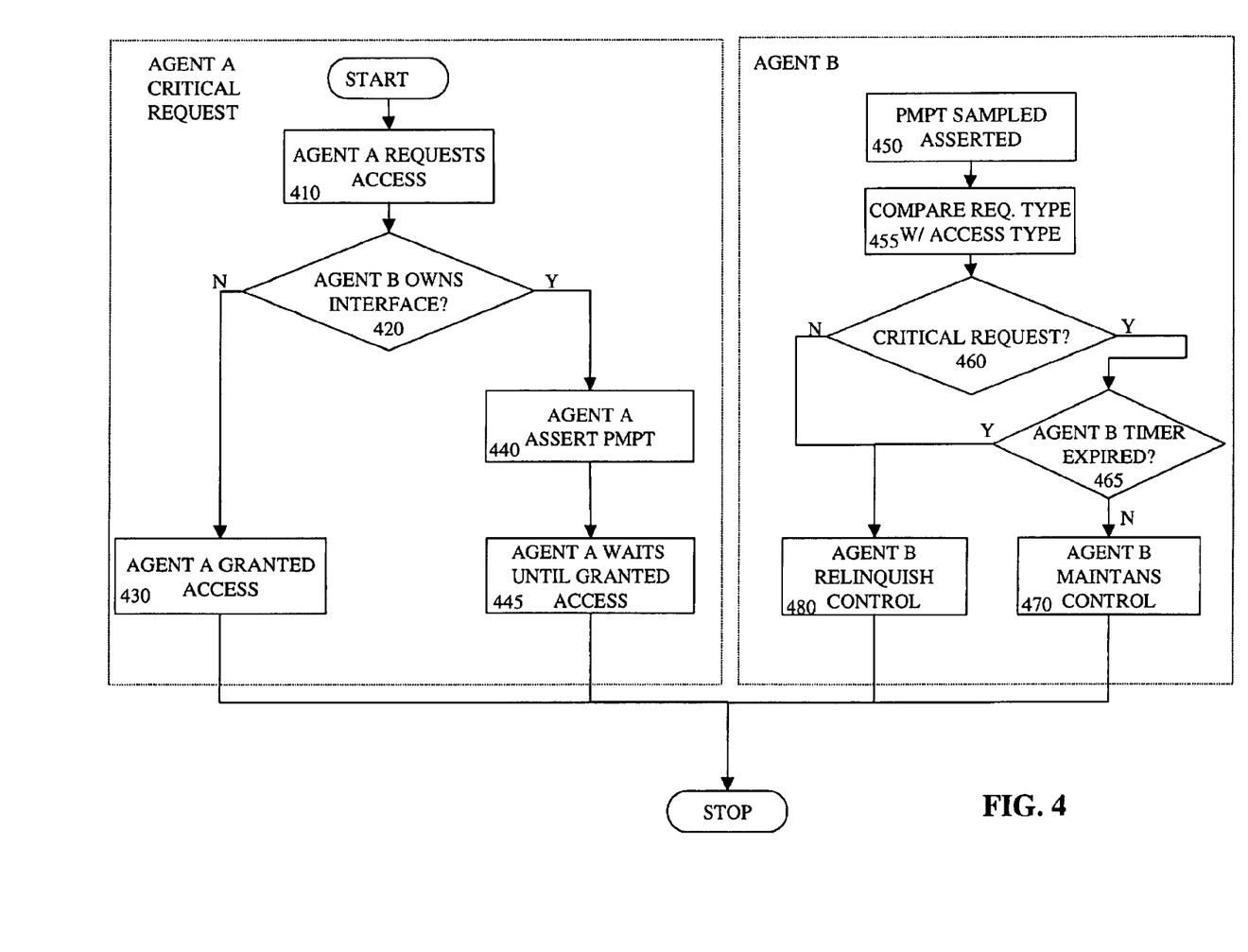
FIG. 4 is a flow diagram for one embodiment of the operation of a hub interface agent signaling a critical request to access the hub interface.

FIG. 4 is a flow diagram of one embodiment of the operation of the hub interface agents upon one agent (e.g., agent A) signaling a critical request to access the hub interface. In such an embodiment, control logic 330 in agent A may assert PMPT wire 259 on any clock edge during which the agent owns access to PMPT wire 259 and has a critical request. As described above, agent A owns access to PMPT wire 259 from one clock after the agent at the opposite end (e.g., agent B) begins to drive the hub interface until one clock after agent B stops driving the hub interface. In addition, ownership of PMPT wire 259 tracks the ownership of the hub interface by agent B with a one base clock delay. Also, an agent may sample PMPT wire 259 if the agent at the opposite end owned access to PMPT wire 259 at the previous clock edge.

Referring to FIG. 4, access to the hub interface is requested by agent A at process block 410. According to one embodiment, a best effort access request may be upgraded to critical. Such a request is upgraded by asserting PMPT wire 259 during the agent's control of PMPT wire 259. At process block 420, it is determined whether agent B has control of the interface. If agent B does not have control of the hub interface, agent A is eventually granted control of the interface, process block 430. However, if agent B has control of the hub interface, PMPT wire 259 is asserted, indicating a critical request, process block 440. At process block 445, agent A waits until it is granted control of the interface.

At process block 450, agent B samples PMPT wire 259. At process block 455, agent B receives the asserted signal and compares the request type of agent A and the request in progress at agent B. At process block 460, it is determined whether the interface access at agent B is critical or best effort. If the access at agent B is critical, it is determined whether slice timer 350 within agent B has expired, process block 465. The expiration of slice time 350 indicates that agent B has owned the interface for too long, and is not to retain access. If the slice timer has not expired, agent B maintains control of the hub interface until the end of the timeslice, process block 470. According to one embodiment, a best effort grant at an agent in control of the hub interface may be upgraded from best effort to critical during the grant. If the access at agent B is best effort or slice timer 350 at agent B has expired, agent B relinquishes control of the hub interface at the next convenient point, process block 480. At process block 480, control of the hub interface is granted to agent A.

Figure 6A:
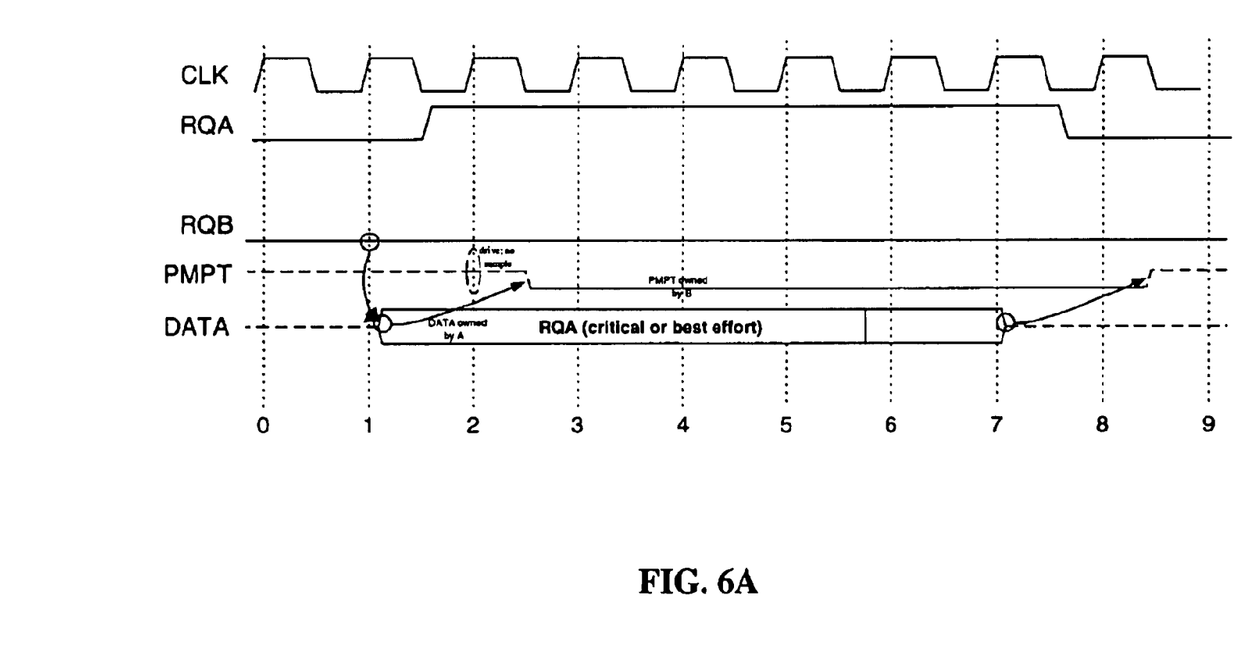
FIG. 6A is a clock diagram for one embodiment of the operation of a PMPT wire.

FIG. 6A is a clock diagram for one embodiment of the operation of PMPT wire 259. This embodiment illustrates the operation of the hub interface when idle and a critical or best effort request is received from agent A, which is a least recently used agent. A request signal to access the hub interface is asserted internal to agent A during clock period 0. Since the interface is idle and agent A is the least recently serviced agent, agent A is immediately granted control and begins to drive data on the interface at clock period 1. RQA signal 254 is subsequently asserted by agent A and sampled at agent B at clock period 2. As described above, agent B is not granted ownership of PMPT wire 259 until one clock period (e.g., clock period 2) after agent A begins to transmit data However, in this scenario, agent B does not request access of the interface. Therefore, agent B does not assert PMPT wire 259.

Figure 6B:
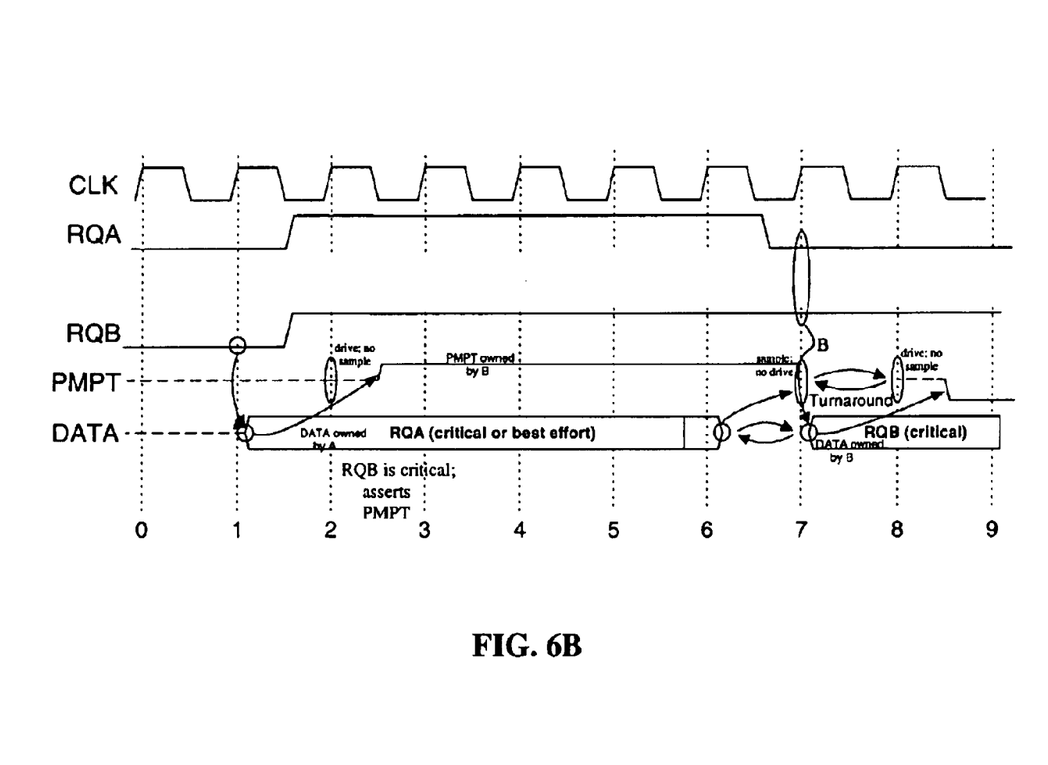
FIG. 6B is a clock diagram for another embodiment of the operation of a PMPT wire.

FIG. 6B is a clock diagram for another scenario of the operation of PMPT wire 259. FIG. 6B illustrates the case where the interface is idle, a request is received from least recently used agent A, and agent B has a simultaneous or subsequent request. Agent A gains the initial access to the interface. This scenario begins the same as the scenario depicted in FIG. 6A. However, RQB 255 is asserted at clock period 1, indicating a request by agent B. During clock period 2, when agent B first gains ownership of PMPT wire 259, agent B asserts PMPT wire 259 indicating a critical request. Agent A completes the transmission of data at clock period 6. However, a one clock turnaround occurs between clock periods 6 and 7 before agent B begins to drive data at clock period 7. Agent A is granted ownership of PMPT wire 259 at clock period 8, one clock period after agent B begins to transmit data. However, agent A does not request access of the interface. Therefore, agent A de-asserts PMPT wire 259.

Figure 6C:
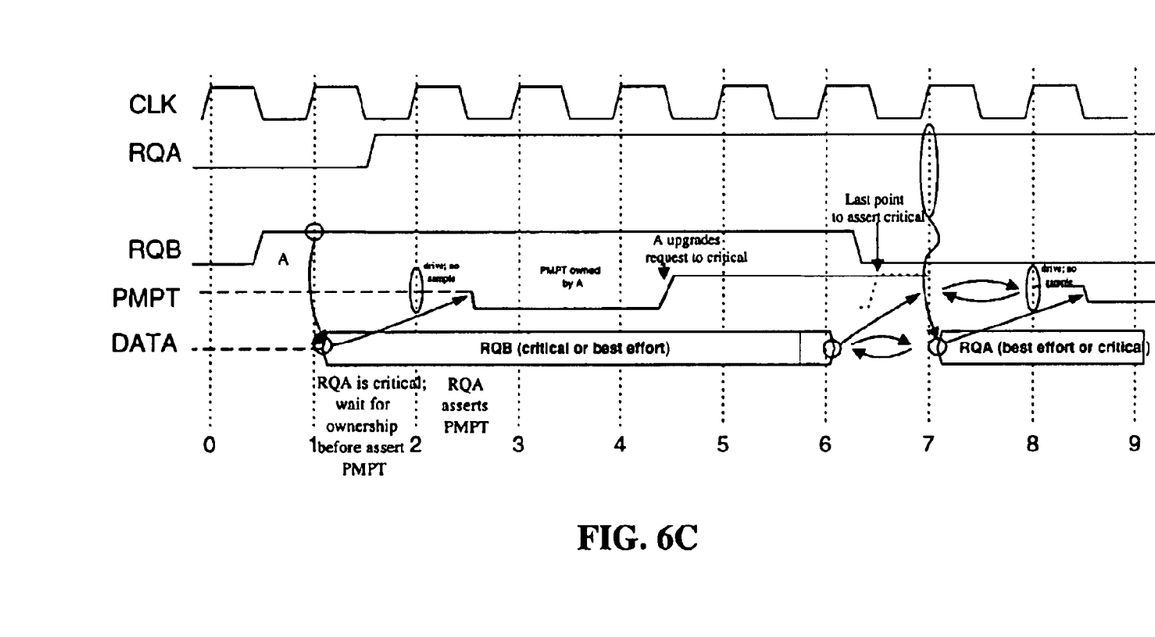
FIG. 6C is a clock diagram for yet another embodiment of the operation of a PMPT wire.

FIG. 6C is a clock diagram for yet another embodiment of the operation of PMPT wire 259. This embodiment illustrates the case where the interface is idle and both agents A and B request the interface. In this case agent A is again the least recently serviced, but agent B has asserted its request (RQB) one clock earlier and hence agent B wins ownership of the interface. In such a scenario, agent B gains the initial access to the interface. Agent B begins to transmit data at clock period 1. As a result, agent A gains ownership of PMPT wire 259 during clock period 2. Initially, the agent A request is a best effort request (e.g., agent A does not assert PMPT wire 259). However, during clock period 4, agent A asserts PMPT wire 259, indicating an upgrade to a critical request. Agent B completes the transmission of data at clock period 6. As described above, a one clock turnaround occurs between clock periods 6 and 7 before agent A begins to drive data at clock period 7. Agent B is granted ownership of PMPT wire 259 at clock period 8. However, agent B does not request access of the interface. Therefore, agent B de-asserts PMPT wire 259.

The foregoing describes one of several embodiments and its variations. In another embodiment, the duration PMPT wire 259 is asserted to indicate a critical request is a pulse of one clock duration, instead of for the remaining tenure of PMPT wire 259 ownership (e.g., the duration a request waits to be granted) as shown previously. Yet another embodiment is to change the semantics associated with PMPT wire 259 such that PMPT wire 259 can be asserted immediately upon requesting the interface without waiting one clock for PMPT wire ownership to track the ownership of the data wires 251. In this embodiment, PMPT wire 259 remains asserted, as in the previous embodiments, if a new critical request is presented while the opposite agent owns the interface.

However, if the interface is idle and the most recently serviced agent has a critical request, then PMPT wire 259 is asserted in this embodiment. When the interface is idle, the least recently serviced agent provisionally has the grant of the interface (which may be lost if the most recently serviced agent asserts a request and no request from the least recently serviced agent claims the interface). Thus the least recently serviced agent does not need to communicate the request type.

Moreover, the most recently serviced agent may communicate the request type by asserting PMPT wire 259 if it has a critical request. The request type may be communicated since the least recently serviced agent may be granted access to the hub interface between the time the most recently serviced agent samples the other agent's request signal and the time the agent asserts its own request signal. In the case where there is a tie between the most recently serviced agent and the least recently serviced agent (e.g., simultaneous presentation of access requests at both agents), the least recently serviced agent gains access to the hub interface event if the least recently serviced agent is a best effort request and the most recently serviced agent is a critical request.

Figure 5:
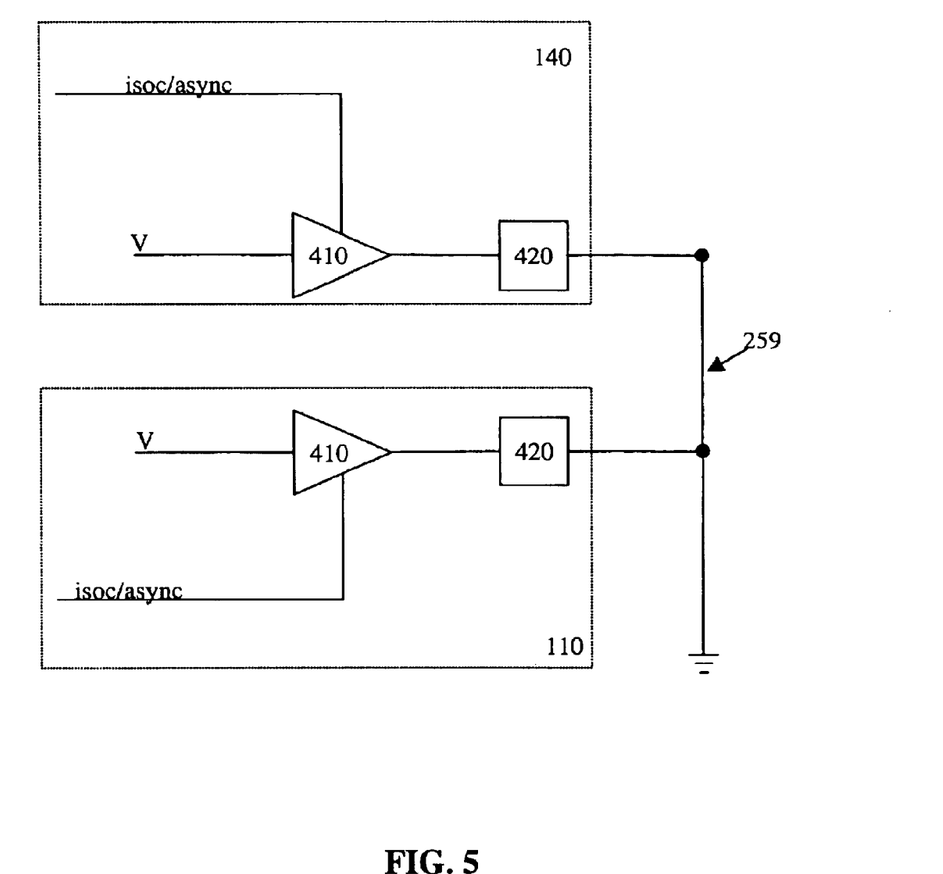
FIG. 5 illustrates one embodiment of a wired-or implementation.

According to one embodiment, PMPT wire 259 is implemented using wired-or signals. FIG. 5 illustrates one embodiment of a wired-or implementation. Drivers 410 are included within each agent on the hub interface. According to one embodiment, drivers 410 are tri-state buffers that drive the critical indication signal onto input/output (I/O) pads 420. The critical indication signal is subsequently transmitted from one I/O pad 420 to the other via PMPT wire 259.

The wired-or signal permits the indication signal to be transmitted via a single wire without additional circuit complexity of managing ownership and turnaround of indication signal wire 259. According to one embodiment, an extra clock cycle is allowed for the rise time of critical signals. In another embodiment, the assertion of the PMPT wire 259 is delayed by one clock if the PMPT wire was asserted in the previous clock.

PMPT wire 259 enables the distinction of best effort and critical requests at a hub interface. The distinction is made via a shared wire such that the pin count of each agent is only increased by one. Although the present invention has been described with reference to a hub interface between MCH 110 and ICH 140 (e.g., hub interface A), one of ordinary skill in the art will appreciate that the present invention may be implemented at other hub interfaces (e.g., hub interface (HI) B in FIG. 1). Further, one of ordinary skill in the art will recognize that the invention may be implemented at interfaces in arbitration systems that do not include hub interfaces.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A computer system comprising:
   a first agent;
   a point to point half duplex interface coupled to the first agent; and
   a second agent, coupled to the point to point half duplex interface, to transmit a signal to the first agent via a first component of the interface indicating a best effort request to access the interface, and the first agent to transmit a signal to the second agent via the first component of the interface indicating a type of access of the interface the first agent is requesting.

2. The computer system of claim 1 wherein each signal is adaptable to be upgraded from a best effort request to a critical request.

3. A computer system comprising:
   a first agent;
   a point to point half duplex interface coupled to the first agent; and
   a second agent, coupled to the point to point half duplex interface, to transmit a signal to the first agent via a first component of the interface indicating a critical request to access the interface, and the first agent to transmit a signal to the second agent via the first component of the interface indicating a type of access of the interface the first agent is requesting.

4. The computer system of claim 3 wherein the second agent preempts access of the interface by the first agent if the signal transmitted from the first agent is a best effort access.

5. The computer system of claim 3 wherein the first component of the interface is a preempt wire.

6. The computer system of claim 5 wherein the preempt wire is a single, half duplex wire, shared by the first and second agents.

7. The computer system of claim 3 wherein the second agent preempts access of the interface be the first agent if a timer corresponding to the first agent has expired.

8. The computer system of claim 3 wherein the first agent retains access of the interface if the signal transmitted from the first agent is a critical access and a timer corresponding to the first agent has not expired.

9. A computer system comprising:
   a memory control hub (MCH);
   a first point to point interface coupled to the MCH; and
   an input/output control hub (ICH) coupled to the point to point interface, the MCH to transmit a signal to the ICH via a first component of the interface indicating a critical request to access the interface.

10. The computer system of claim 9 wherein the ICH transmits a signal to the MCH via the first component of the interface indicating the type of access of the interface the ICH is requesting the MCH.

11. The computer system of claim 10 wherein the MCH preempts access of the interface by the ICH if the signal transmitted from the ICH is a best effort access or a timer corresponding to the ICH has expired.

12. The computer system of claim 10 wherein the ICH retains access of the interface if the signal transmitted from the ICH is a critical access and a timer corresponding to the ICH has not expired.

13. A computer system comprising:
    a memory control hub (MCH);
    a first point to point interface coupled to the MCH; and
    an input/output control hub (ICM) coupled to the point to point interface, the MCH to transmit a signal to the ICH via a first component of the interface indicating a best effort request to access the interface.

14. A method comprising:
    a first agent requesting a critical access to a point to point half duplex interface;
    determining whether a second agent has control of the interface;
    if so, asserting a preempt component of the interface at the first agent; and
    waiting for control of the interface to be granted to the first agent.

15. The method of claim 14 further comprising granting control of the interface to the first agent if the second agent does not have control of the interface.

16. The method of claim 15 further comprising:
    the second agent sampling the asserted preempt component of the interface;
    determining whether the current access of the interface at the second agent is a critical access; and
    if not, relinquishing control of the interface by the second agent.

17. The method of claim 16 further comprising granting control of the interface to the first agent after the second agent has relinquished control.

18. The method of claim 16 further comprising:
    determining whether a timer has expired if the current access of the interface at the second agent is a critical access;
    if so, relinquishing control of the interface by the second agent; and
    granting control of the interface to the first agent.

19. The method of claim 16 further comprising:
    determining whether a timer has expired if the current access of the interface at the second agent is a critical access; and
    if not, retaining control of the interface at the second agent.

20. The method of claim 15 wherein the first agent asserts the preempt component of the interface one clock cycle after the second agent is granted control of the interface.

21. The method of claim 15 wherein the preempt component of the interface is asserted for the duration the first agent waits to be granted control of the interface.

22. The method of claim 15 wherein the preempt component of the interface is asserted for a one clock cycle duration.

23. The method of claim 15 further comprising upgrading the requested access to the point to point half duplex interface from a best effort request to the critical request.

* * * * *

UNITED STATES PATENT AND TRADEMARK OFFICE
CERTIFICATE OF CORRECTION

PATENT NO. : 6,842,813 B1  Page 1 of 1
DATED : January 11, 2005
INVENTOR(S) : Osborne et al.

It is certified that error appears in the above-identified patent and that said Letters Patent is hereby corrected as shown below:

Column 7,
Line 53, delete "be" and insert -- by --.

Column 8,
Line 13, delete "(ICM)" and insert -- (ICH) --.

Signed and Sealed this

Seventh Day of June, 2005

JON W. DUDAS
*Director of the United States Patent and Trademark Office*